US011337369B2

(12) United States Patent
Kurihara et al.

(10) Patent No.: US 11,337,369 B2
(45) Date of Patent: May 24, 2022

(54) ELECTRIC POWER EQUIPMENT

(71) Applicant: HONDA MOTOR CO., LTD., Tokyo (JP)

(72) Inventors: Mai Kurihara, Wako (JP); Yoshitaka Oota, Wako (JP); Fumiya Isono, Wako (JP); Yoshihiro Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 468 days.

(21) Appl. No.: 16/463,950

(22) PCT Filed: Nov. 17, 2017

(86) PCT No.: PCT/JP2017/041499
§ 371 (c)(1),
(2) Date: May 24, 2019

(87) PCT Pub. No.: WO2018/101086
PCT Pub. Date: Jun. 7, 2018

(65) Prior Publication Data
US 2020/0375103 A1    Dec. 3, 2020

(30) Foreign Application Priority Data

Nov. 30, 2016    (JP) .............................. JP2016-232330

(51) Int. Cl.
*A01D 34/78*    (2006.01)
*A01D 34/68*    (2006.01)
(Continued)

(52) U.S. Cl.
CPC ......... *A01D 34/78* (2013.01); *A01D 34/6806* (2013.01); *A01D 34/824* (2013.01); *A01D 2034/6843* (2013.01); *A01D 2101/00* (2013.01)

(58) Field of Classification Search
CPC .. A01D 34/78; A01D 34/6806; A01D 34/824; A01D 2034/6843; A01D 2101/00
See application file for complete search history.

(56) References Cited

U.S. PATENT DOCUMENTS 6,082,083 A    7/2000  Stalpes et al.
7,762,050 B1   7/2010  Kaskawitz
(Continued)

FOREIGN PATENT DOCUMENTS

DE    202015007933 U1    12/2015
DE    102015219794 A1     4/2016
(Continued)

OTHER PUBLICATIONS

English translation of International Search Report for International Application No. PCT/JP2017/041499, dated Feb. 13, 2018, 2 pages.
(Continued)

*Primary Examiner* — Abigail A Risic
(74) *Attorney, Agent, or Firm* — Armstrong Teasdale LLP

(57) ABSTRACT

To enable the rotational speed of the cutter blade to be set variably and to allow the operation therefor to be performed with ease and accuracy, multiple switches (74, 76) for setting the rotational speed of the cutter blade electric motor (6) to mutually different rotational speeds, and multiple operation buttons (78, 80) provided for the respective switches (74, 76) are included on a handle (20), wherein the operation buttons (78, 80) have operation parts (78A, 80A) provided with mutually different sizes.

5 Claims, 16 Drawing Sheets

(51) Int. Cl.
*A01D 34/82* (2006.01)
*A01D 101/00* (2006.01)

(56) References Cited

U.S. PATENT DOCUMENTS

| | | | |
|---|---|---|---|
| 9,403,435 | B2 | 8/2016 | Bejcek |
| 9,706,706 | B2 | 7/2017 | Barendrecht |
| 2013/0046448 | A1 | 2/2013 | Fan et al. |
| 2013/0047565 | A1 | 2/2013 | Shida et al. |
| 2013/0081500 | A1* | 4/2013 | Helin .................... A01D 34/006 74/473.3 |
| 2014/0345416 | A1* | 11/2014 | Kaskawitz ............. G05G 13/00 74/523 |
| 2016/0149520 | A1 | 5/2016 | Ota et al. |
| 2016/0324065 | A1* | 11/2016 | Smith .................... A01D 34/52 |
| 2017/0142898 | A1* | 5/2017 | Bejcek ................ A01D 34/006 |
| 2019/0307066 | A1* | 10/2019 | Jiang .................... A01D 34/824 |
| 2020/0375103 | A1* | 12/2020 | Kurihara .............. A01D 34/824 |
| 2021/0037701 | A1* | 2/2021 | Kaskawitz ........... A01D 34/824 |
| 2021/0051848 | A1* | 2/2021 | Bejcek .................. A01D 34/69 |

FOREIGN PATENT DOCUMENTS

| | | |
|---|---|---|
| FR | 3004680 A1 | 10/2014 |
| JP | H0255521 U | 4/1990 |
| JP | H08259128 A | 10/1996 |
| JP | 2001113041 A | 4/2001 |
| JP | 2003070168 A | 3/2003 |
| JP | 2007116957 A | 5/2007 |
| JP | 2007195557 A | 8/2007 |
| JP | 2013146195 A | 8/2013 |
| JP | 2016096805 A | 5/2016 |
| JP | 2016097494 A | 5/2016 |
| KR | 20150002850 U | 7/2015 |
| KR | 200480534 Y1 | 6/2016 |
| WO | 2016106708 A1 | 7/2016 |

OTHER PUBLICATIONS

Extended European Search Report for EP Application No. 17876961.8, dated Dec. 13, 2019, 8 pages.

* cited by examiner

ELECTRIC POWER EQUIPMENT

CROSS-REFERENCE TO RELATED APPLICATIONS

This application is a U.S. National Phase Application of PCT/JP2017/041499, filed Nov. 17, 2017, which claims the benefit of priority to JP Application No. 2016232330, filed Nov. 30, 2016, the contents of which are hereby expressly incorporated by reference in their entirety.

TECHNICAL FIELD

The present invention relates to electric power equipment, and particularly relates to self-propelled electric power equipment, such as electric lawn mowers, electric snow blowers, and electric tillers.

As an electric lawn mower, there is known a self-propelled electric lawn mower in which wheels, a mowing unit including a cutter blade, and electric motors for driving them are provided on a main body, a longitudinal member extends rearward from the main body, and a handle is attached to the free end of the longitudinal member (longitudinal bar) (Patent Documents 1 to 3). In such an electric lawn mower, when a switch provided on the handle is turned on, the electric motor is activated to rotate the cutter blade.

PRIOR ART DOCUMENT(S)

Patent Document(s)

Patent Document 1: JPH2-55521U
Patent Document 2: US20130046448A1
Patent Document 3: JP2003-70168A

SUMMARY OF THE INVENTION

Task to be Accomplished by the Invention

In the conventional electric lawn mower, the rotation of the cutter blade is only switched on and off, and the rotational speed cannot be set variably.

An object to be achieved by the present invention is to enable the rotational speed of the cutter blade to be set variably and to allow the operation therefor to be performed with ease and accuracy.

Means to Accomplish the Task

Electric power equipment according to one embodiment of the present invention comprises: a main body (2); a work unit (3) and wheels (4, 5) provided on the main body (2); a work unit electric motor (6) provided on the main body (2) for driving the work unit (3); a handle (20) including a longitudinal member (20A, 20B) extending rearward from the main body (2); and a speed setting device provided on the handle (20) for setting a rotational speed of the work unit electric motor (6), wherein the speed setting device comprises: multiple switches (74, 76) for setting mutually different rotational speeds; and multiple operation buttons (78, 80) respectively provided for the multiple switches (74, 76), wherein the multiple operation buttons (78, 80) have operation parts (78A, 80A) provided with mutually different sizes.

According to this arrangement, the rotational speed of the work unit electric motor (6) is switchably set by operating the switches (74, 76) through the operation buttons (78, 80). Further, because the operation parts (78A, 80A) are mutually different in size, the operation button (78, 80) corresponding to the rotational speed to be set can be visually selected by the operator with ease and accuracy.

In the above electric power equipment, preferably, the operation parts (78A, 80A) of the switches are larger in size for higher rotational speed setting.

According to this arrangement, the operation button (78, 80) corresponding to the rotational speed to be set can be visually selected by the operator even more accurately.

In the above electric power equipment, preferably, the speed setting device is configured to set a maximum rotational speed of the work unit electric motor (6), and an on/off switch (71) for turning on and off the work unit electric motor (6) and an operation element (50) of the on/off switch are further provided on the handle (20).

According to this arrangement, it is possible to turn on/off the work unit electric motor (6) by operating the operation element (50), separately from the setting of the maximum rotational speed.

In the above electric power equipment, preferably, the operation element of the on/off switch (71) consists of a U-shaped operation lever (50) extending laterally and having left and right ends rotatably attached to the handle (20), and the multiple operation buttons (78, 80) are arranged at a laterally central part of the handle (20).

According to this arrangement, operation for switching the maximum rotational speed of the cutter blade (3) using the operation buttons (78, 80) and operation for rotating/stopping the cutter blade (3) using the operation lever (50) can be performed simultaneously at parts of the handle (20).

In one embodiment, the electric power equipment includes a cutter blade (3) for lawn mowing as the work unit.

According to this arrangement, an electric lawn mower is constituted.

Effect of the Invention

In the electric lawn mower of the present invention, the rotational speed of the cutter blade can be set variably and the operation therefor can be performed with ease and accuracy.

MODE(S) FOR CARRYING OUT THE INVENTION

An embodiment in which electric power equipment according to the present invention is applied to an electric lawn mower will be described in the following with reference to FIGS. 1 to 14.

Figure 1:
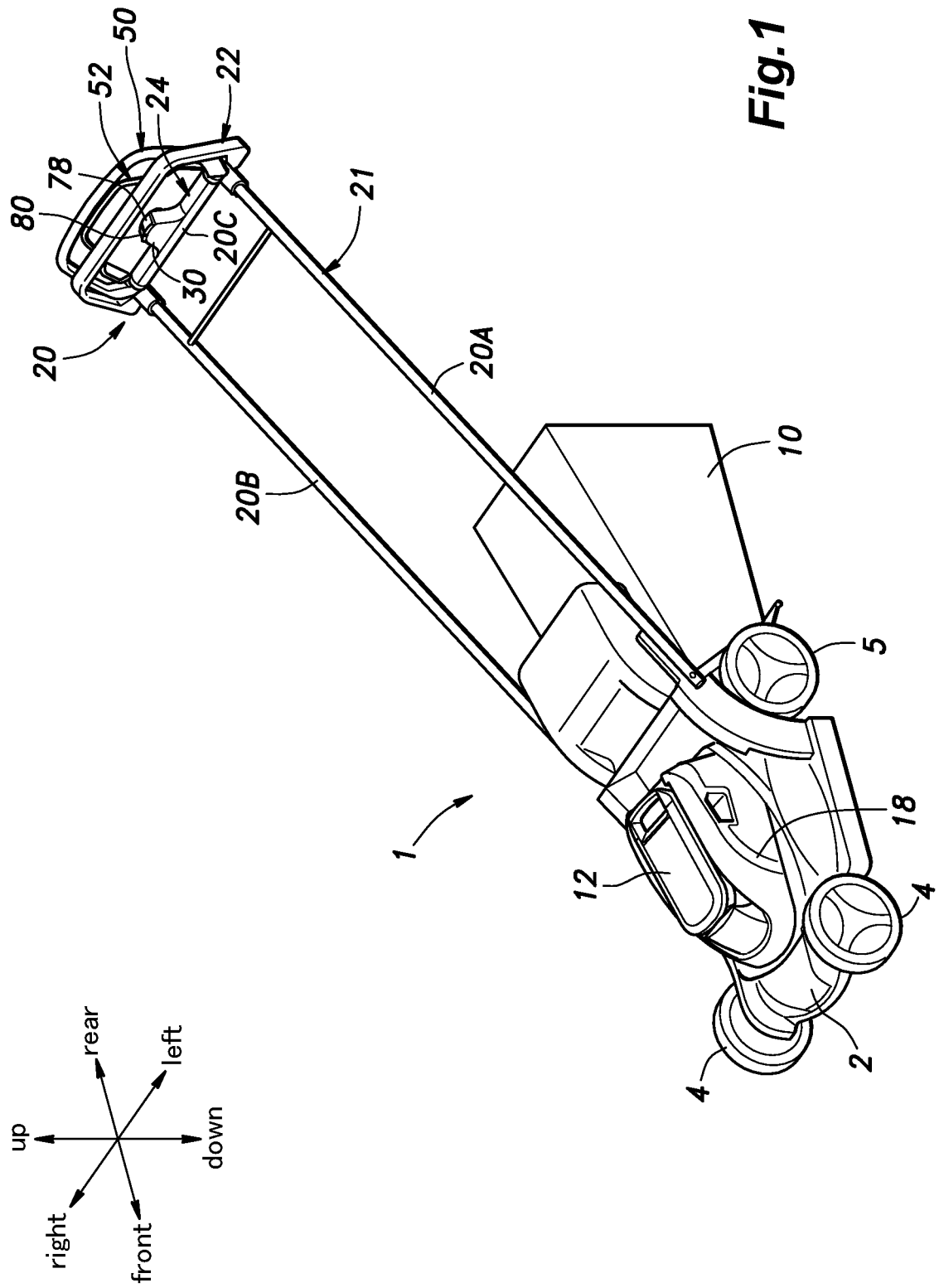
FIG. 1 is a perspective view showing an embodiment in which electric power equipment according to the present invention is applied to an electric lawn mower.
Figure 2:
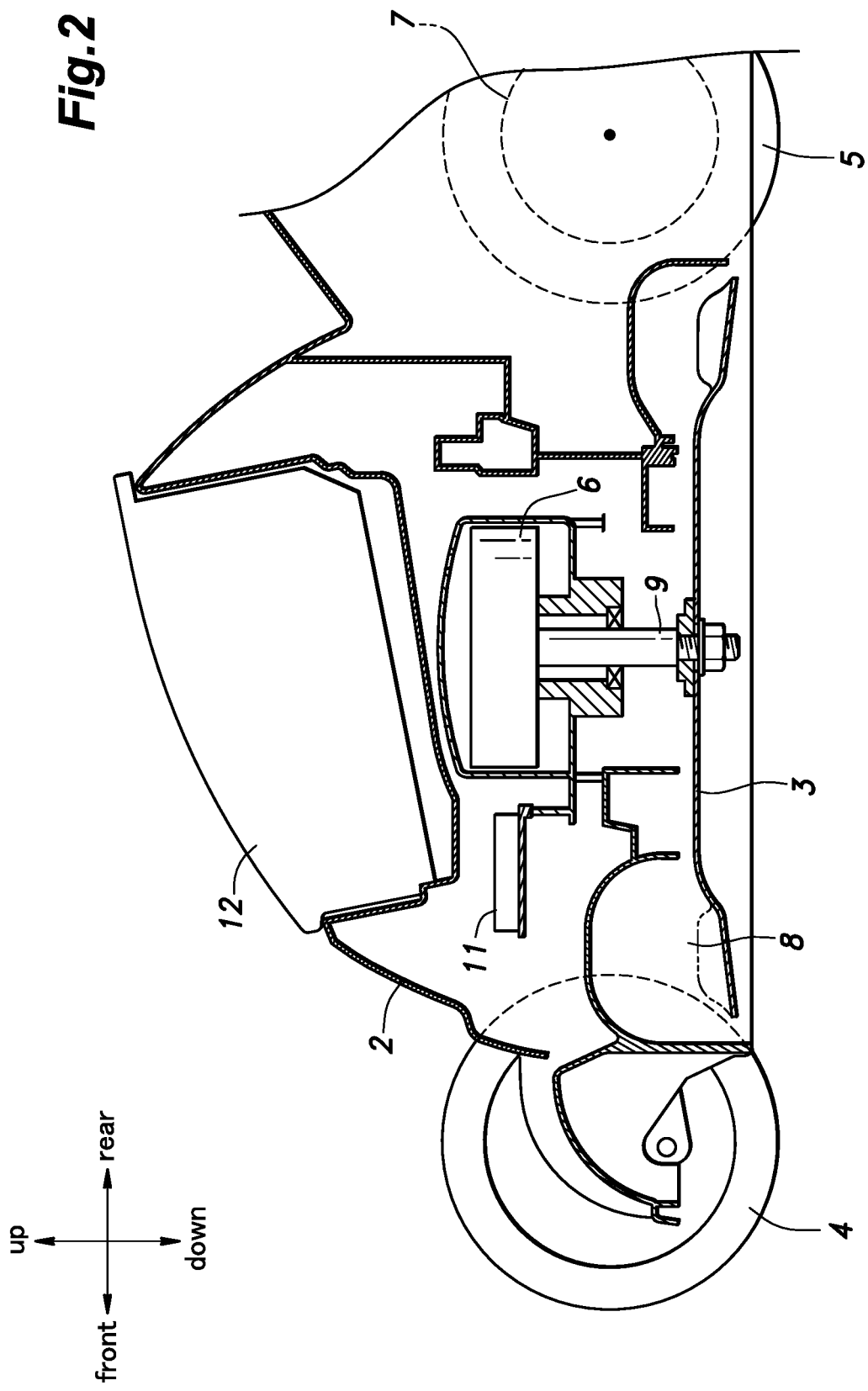
FIG. 2 is a vertical sectional view of a main body of the electric lawn mower according to the embodiment.

As shown in FIGS. 1 and 2, the electric lawn mower 1 includes a main body 2, a cutter blade 3 provided in the main body 2, a pair of front wheels 4 and a pair of rear wheels 5 each supported rotatably on the main body 2, a cutter blade electric motor (work unit electric motor) 6 provided in the main body 2 to drive the cutter blade 3, and a travel electric motor 7 for driving the rear wheels 5.

The cutter blade 3 is disposed in a cutter blade chamber 8 formed in a bottom of the main body 2 so as to open downward such that the cutter blade 3 is rotatable in a substantially horizontal plane. The cutter blade 3 is secured to a lower end of an output shaft 9 of the cutter blade electric motor 6 and is driven by the output shaft 9 to rotate about a vertical axis. A grass bag 10 is provided to a rear end of the main body 2 to collect the grass cut by the cutter blade 3.

The main body 2 is provided with a controller 11 for controlling the cutter blade electric motor 6 and the travel electric motor 7. The main body 2 is further provided with a battery 12 that supplies electric power to the cutter blade electric motor 6, the travel electric motor 7, and the controller 11.

A handle 20 is attached to the main body 2. The handle 20 includes a handle bar 21 formed in a U-shape by a pair of left and right longitudinal members (longitudinal bars) 20A, 20B each having a base end secured to the main body 2 and extending from the main body 2 upward in the rearward direction and a cross member (cross bar) 20C extending laterally to connect free ends of the longitudinal members 20A, 20B to each other, and a loop handle 22 attached to the cross member 20C.

Figure 3:
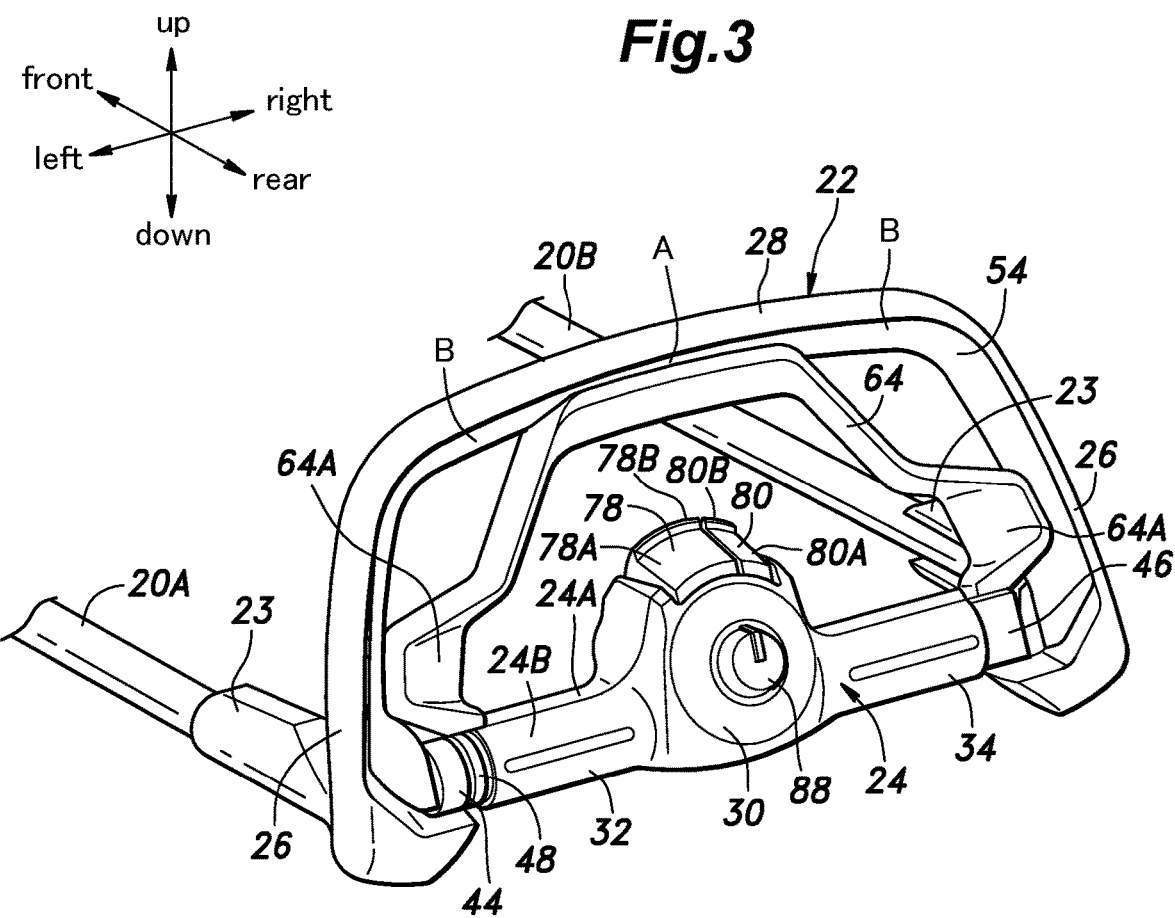
FIG. 3 is a front perspective view of an operating portion of the electric lawn mower according to the embodiment.

The loop handle 22 is formed by molding a resin. As shown in FIG. 3, the loop handle 22 includes: a pair of left and right fixing parts 23 each having a C-shaped cross section and fitted on a part of a corresponding one of the longitudinal members 20A, 20B adjoining the free end thereof so as to be secured to the corresponding one of the longitudinal members 20A, 20B; a lower bar 24 extending laterally behind the cross member 20C (see FIG. 1) and having left and right ends connected to the rear ends of the respective fixing parts 23; a pair of left and right side bars 26 respectively extending upright from the left and right ends of the lower bar 24; and an upper bar 28 extending laterally and having left and right ends connected to the upper ends of the respective side bars 26. The lower bar 24, the side bars 26, and the upper bar 28 jointly form a substantially rectangular loop shape as seen from the front, and the upper bar 28 serves as a handle grip to be held by the hands of an operator.

The lower bar 24 is formed as an assembly of two halves, namely, a front base portion 24A integral with the side bars 26, and a cover member 24B attached to a rear side of the base portion 24A, and includes an electric box 30 located at a laterally central position and a pair of left and right tubular portions 32, 34 extending leftward and rightward from the left and right sides of the electric box 30, respectively.

Figure 6:
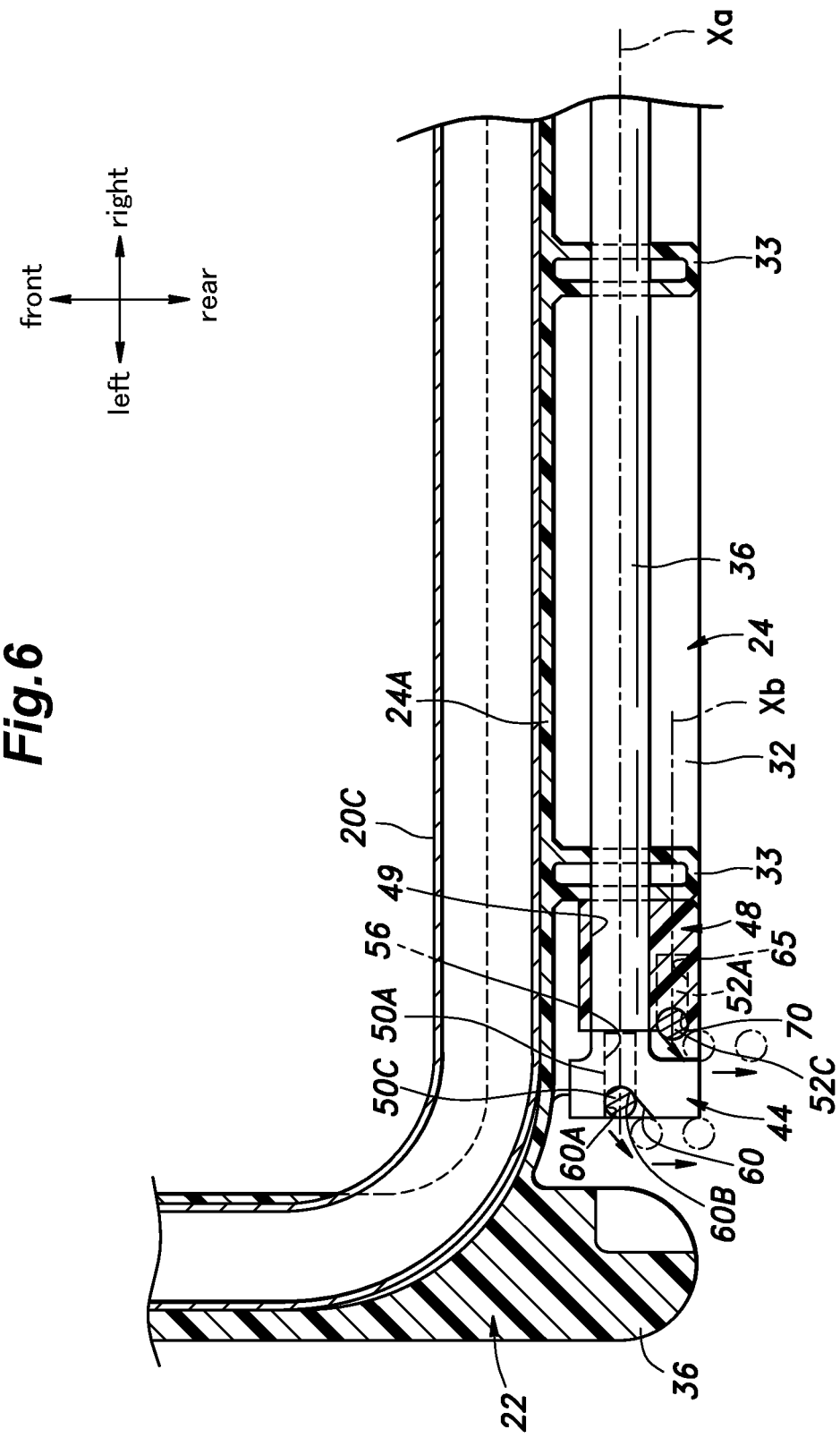
FIG. 6 is a sectional plan view of a left side portion of the operating portion of the electric lawn mower according to the embodiment.
Figure 7:
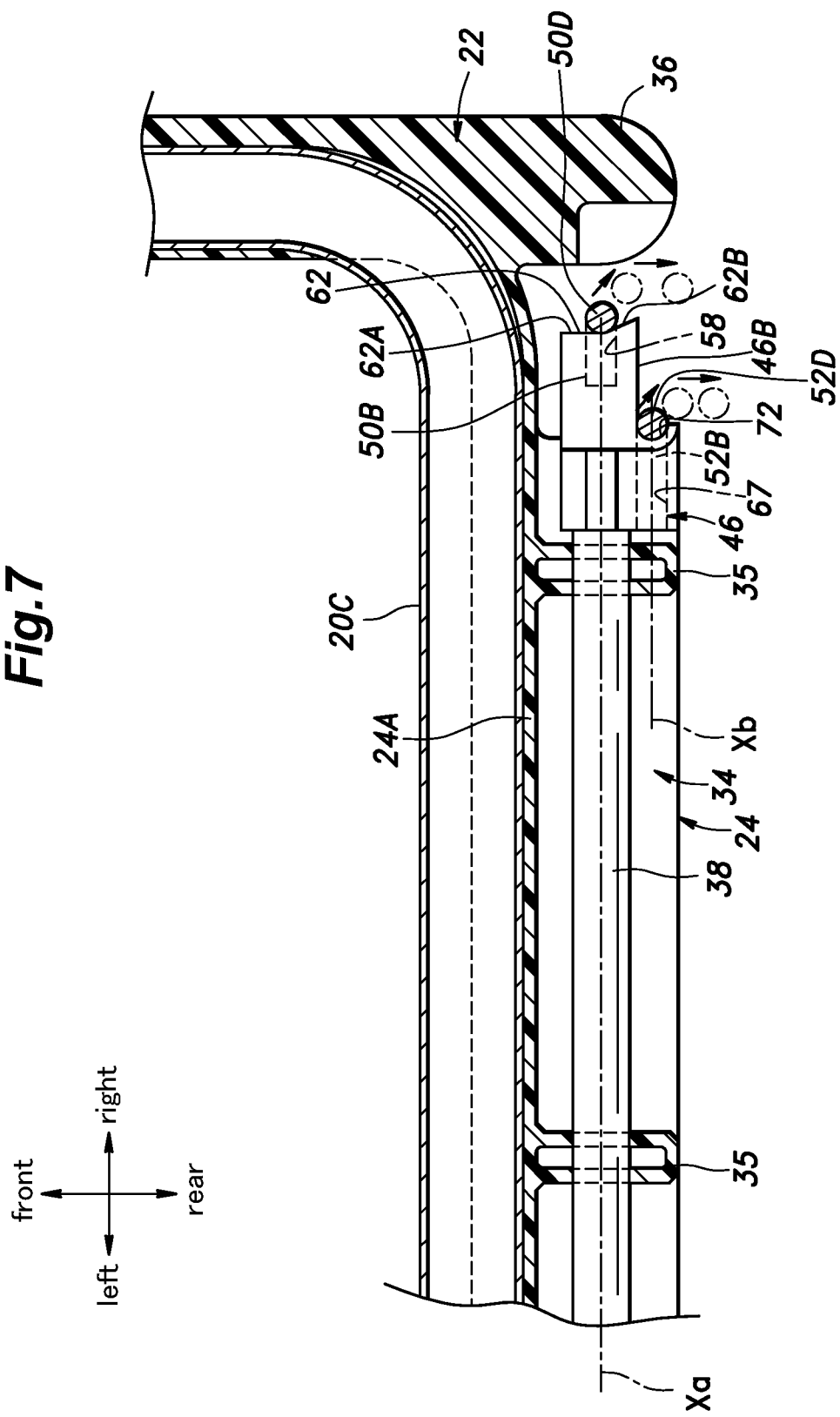
FIG. 7 is a sectional plan view of a right side portion of the operating portion of the electric lawn mower according to the embodiment.
Figure 8:
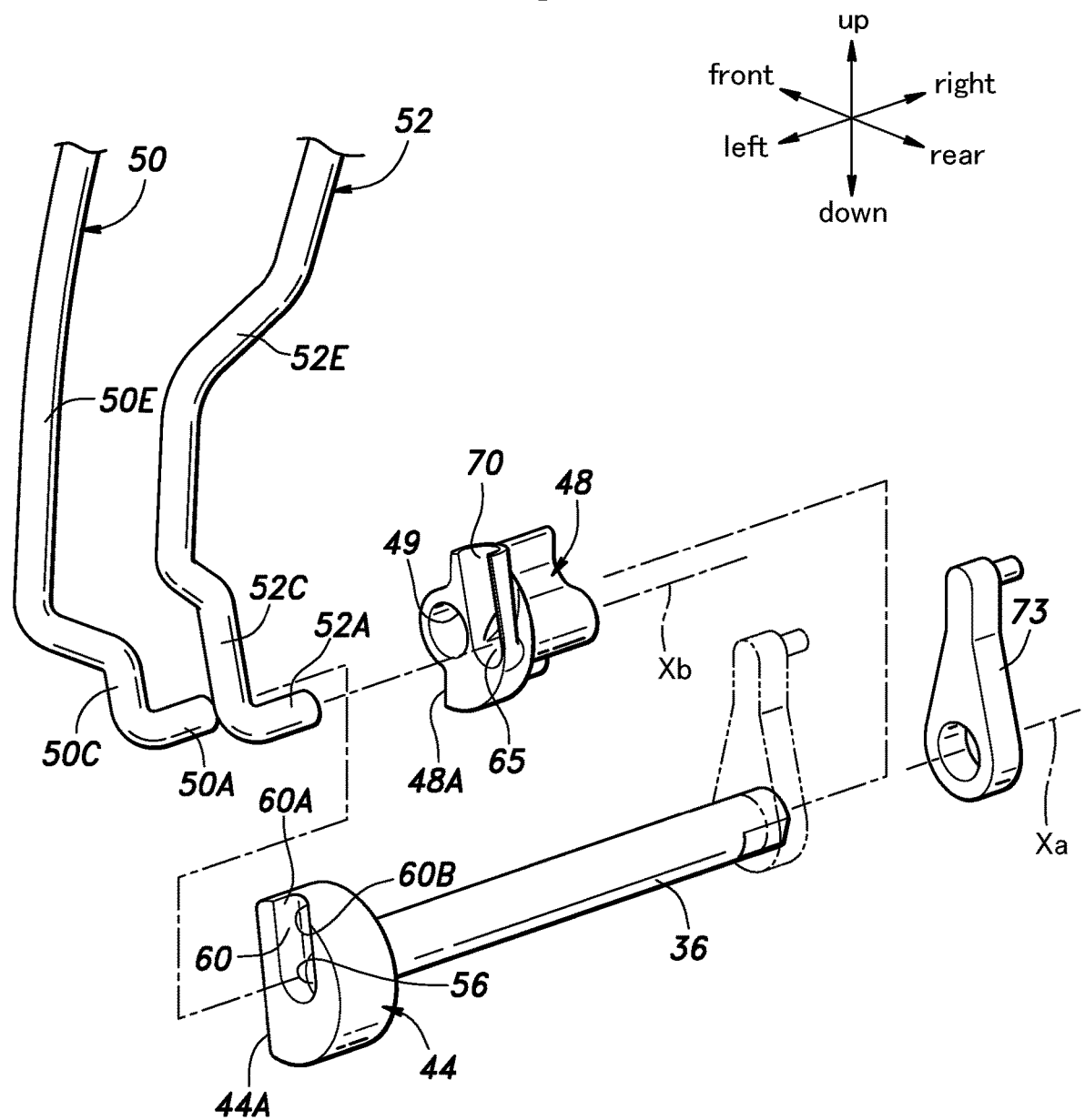
FIG. 8 is an exploded perspective view showing an engagement relationship between a left rotary shaft and each of two operation levers of the electric lawn mower according to the embodiment.
Figure 9:
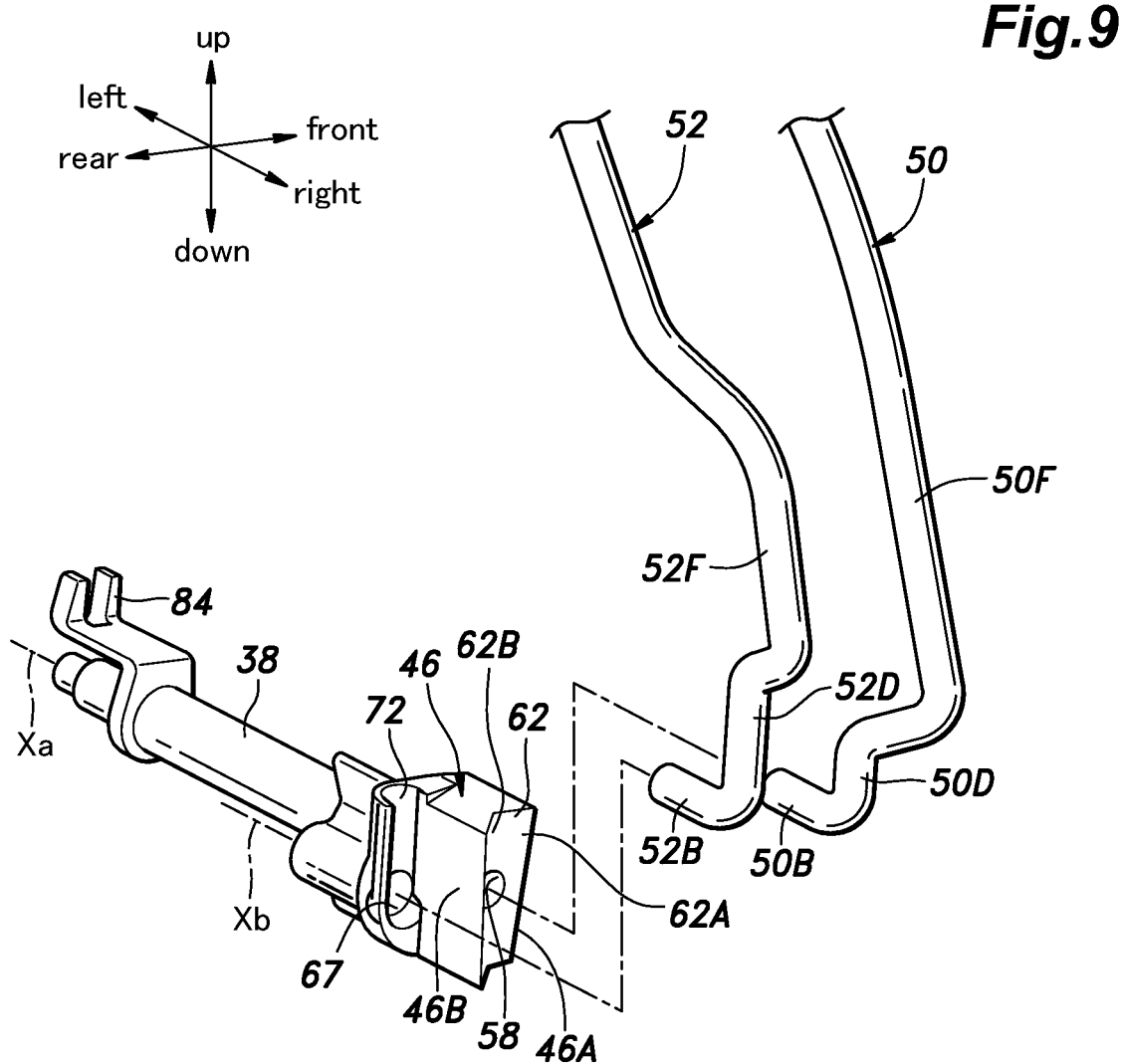
FIG. 9 is an exploded perspective view showing an engagement relationship between a right rotary shaft and each operation lever of the electric lawn mower according to the embodiment.

As shown in FIG. 6, the left tubular portion 32 includes brackets 33 that support a left rotary shaft (first rotary shaft) 36 extending laterally in the left tubular portion 32, such that the left rotary shaft 36 is rotatable about a horizontal axis. As shown in FIG. 7, the right tubular portion 34 includes brackets 35 that support a right rotary shaft (second rotary shaft) 38 extending laterally in the right tubular portion 34, such that the right rotary shaft 38 is rotatable about the horizontal axis same as that of the left rotary shaft 36. Namely, the tubular portions 32, 34 support the left rotary shaft 36 and the right rotary shaft 38 so as to be independently rotatable about the same axis. In the following description, the central axis of the left rotary shaft 36 and the right rotary shaft 38 will be referred to as a first central axis Xa.

The left rotary shaft 36 is rotatable between a later-described first rotational position and a second rotational position separated from the first rotational position by a prescribed rotation angle, while the right rotary shaft 38 is rotatable between a later-described third rotational position and a fourth rotational position separated from the third rotational position by a prescribed rotation angle. When the left rotary shaft 36 and the right rotary shaft 38 are viewed together, the first rotational position and the third rotational position are the same rotational position, while the second rotational position and the fourth rotational position are the same rotational position.

The left rotary shaft 36 is formed by molding a resin, and is integrally provided with a left lever support block 44 at an outer end (left end) thereof. The right rotary shaft 38 is formed by molding a resin, and is integrally provided with a right lever support block 46 at an outer end (right end) thereof. A lever support collar member 48 having a through-hole 49 is fitted on an outer circumference of a part of the left rotary shaft 36 near the outer end thereof, such that the lever support collar member 48 is rotatable about the first central axis Xa.

Left and right end portions of a cutter blade operation lever (first operation lever) 50 are connected with the left lever support block 44 and the right lever support block 46, respectively, and left and right end portions of a travel operation lever (second operation lever) 52 are connected with the lever support collar member 48 and the right lever support block 46, respectively.

In the following, detailed explanation will be made of how the cutter blade operation lever 50 and the travel operation lever 52 are connected with the left lever support block 44, the right lever support block 46 and the lever support collar member 48, with reference to FIGS. 4 and 6 to 13.

The cutter blade operation lever 50 is formed by bending a metal rod having a circular cross section. The cutter blade operation lever 50 integrally includes: left and right shaft portions 50A, 50B extending along the first central axis Xa at the respective ends of the cutter blade operation lever 50; left and right engagement legs 50C, 50D bent upward from the outer ends of the respective shaft portions 50A, 50B at a right angle so as to extend radially outward (upward) with respect to the first central axis Xa; left and right side portions 50E, 50F extending further upward from the upper ends of the respective engagement legs 50C, 50D; and a lever grip 50G bent laterally from the upper ends of the side portions 50E, 50F and extending laterally behind the upper bar 28, whereby the cutter blade operation lever 50 has a substantially U-shape as seen from the front, and is given a spring property in a direction of movement of the engagement legs 50C, 50D toward and away from each other. An exterior cover 54 made by molding a resin is fitted to the rear side of the cutter blade operation lever 50 to cover the portions other than the shaft portions 50A, 50B.

The left lever support block 44 and the right lever support block 46 are respectively provided with round bearing holes 56, 58 on outer sides thereof such that the shaft portions 50A, 50B of the cutter blade operation lever 50 are received in the bearing holes 56, 58 so as to be rotatable about the first central axis Xa. The outer end surface of the left lever support block 44, namely, the end surface in which the bearing hole 56 is opened, is formed with an engagement recess (first engagement recess) 60 that extends from the bearing hole 56 radially outward (upward) with respect to the left rotary shaft 36 to engage the engagement leg (first rod) 50C. The outer end surface of the right lever support block 46 is formed with a cam surface 62 against which the engagement leg 50D abuts. The engagement leg 50C is pressed against the bottom of the engagement recess 60 and the engagement leg 50D is pressed against the cam surface 62 by the spring force of the cutter blade operation lever 50 itself.

With the shaft portions 50A, 50B received in the corresponding bearing holes 56, 58, the cutter blade operation lever 50 is rotatable relative to the left rotary shaft 36 and the right rotary shaft 38 about the first central axis Xa. Further, in a state where the engagement leg 50C is engaged with the engagement recess 60 by the spring force of the cutter blade operation lever 50 itself, the cutter blade operation lever 50 is connected with the left rotary shaft 36 in a force transmitting relationship.

With the engagement leg 50C engaged with the engagement recess 60, namely, in a state where the cutter blade operation lever 50 and the left rotary shaft 36 are connected with each other in a force transmitting relationship, the cutter blade operation lever 50 is rotatable about the first central axis Xa with the shaft portions 50A, 50B serving as fulcrums between a position (hereinafter, off position) where the cutter blade operation lever 50 has been rotated clockwise in FIG. 10 (tilted rearward) and the lever grip 50G is positioned distant from the upper bar 28 as shown by imaginary lines in FIG. 10 and a position (hereinafter, on position) where the cutter blade operation lever 50 has been rotated from the off position counterclockwise in FIG. 10 (tilted forward) and the lever grip 50G is positioned close to the upper bar 28 as shown by solid lines in FIG. 10.

The cutter blade operation lever 50 is at the off position when the left rotary shaft 36 is at the first rotational position, and the cutter blade operation lever 50 is at the on position when the left rotary shaft 36 is at the second rotational position. As shown in FIG. 10, the first rotational position of the left rotary shaft 36 and the off position of the cutter blade operation lever 50 are determined by abutment of a stopper surface 44A formed in the left lever support block 44 against a stopper surface 25A formed in the base portion 24A and abutment of the cutter blade operation lever 50 against the travel operation lever 52 placed at the off position, while the on position of the cutter blade operation lever 50 is determined by abutment of the exterior cover 54 against the loop handle 22.

Figure 10:
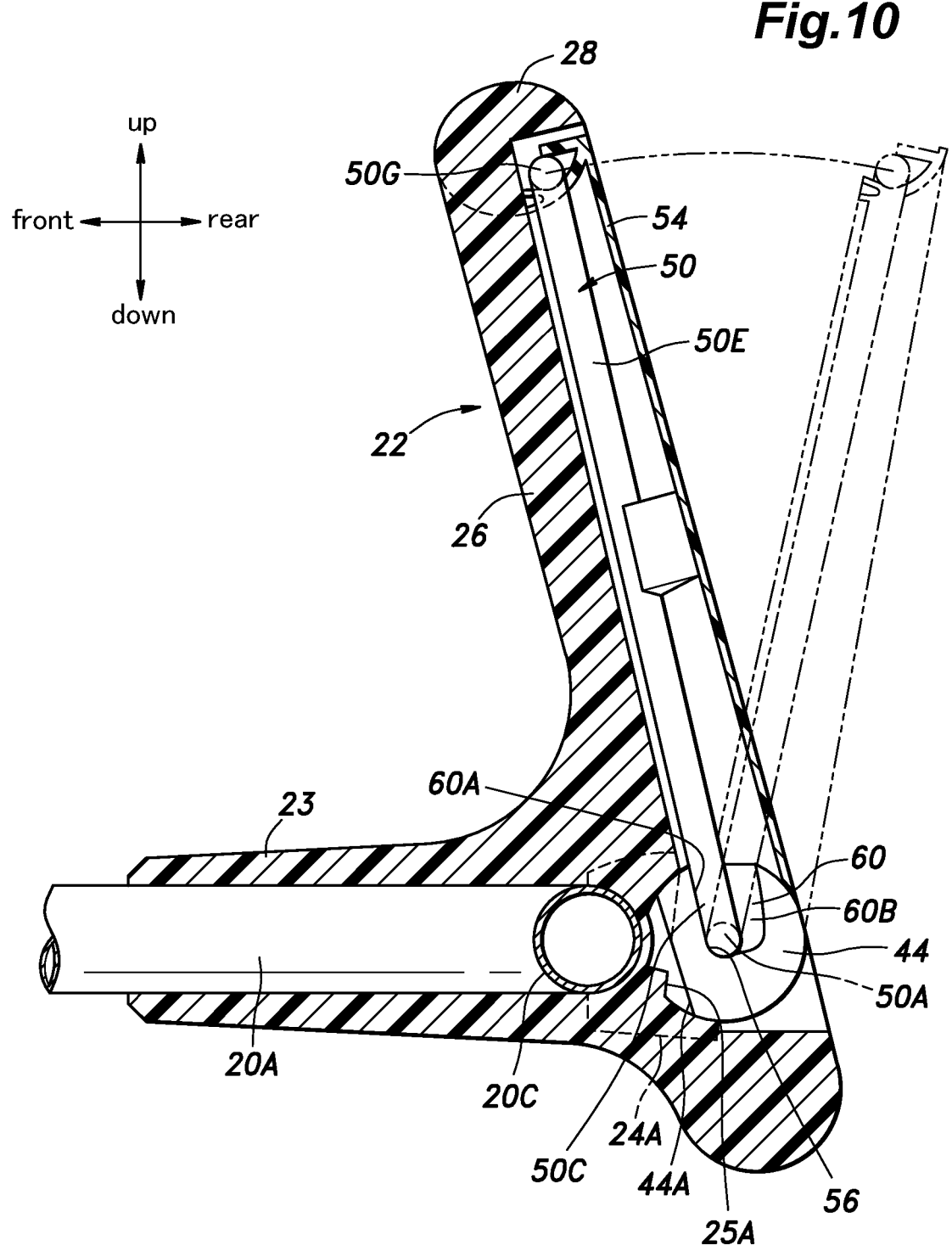
FIG. 10 is a vertical sectional view of a left side portion of a cutter blade operation lever of the electric lawn mower according to the embodiment.

A torsion coil spring 66 (see FIG. 5) is provided between the left rotary shaft 36 and the lower bar 24 to urge the left rotary shaft 36 clockwise as seen in FIG. 10. Thereby, the cutter blade operation lever 50 is urged together with the left rotary shaft 36 by the torsion coil spring 66 toward the off position, so that when no external force is applied, the cutter blade operation lever 50 is placed at the off position.

As shown in FIG. 6, the engagement recess 60 is defined by a front barrier surface 60A and a rear inclined surface 60B. Thereby, even if a large external force is applied to the cutter blade operation lever 50 in a forward tilting direction, abutment of the front barrier surface 60A against the engagement leg 50C prevents the engagement leg 50C from getting out of the engagement recess 60. In a case where an external force is applied to the cutter blade operation lever 50 in a rearward tilting direction, if the external force is smaller than a prescribed value smaller than the urging force of the torsion coil spring 66, the engagement leg 50C is retained in the engagement recess 60, but if the rearward external force acting on the cutter blade operation lever 50 becomes larger than or equal to the prescribed value, the cutter blade operation lever 50 itself undergoes resilient deformation and the engagement leg 50C slides along the inclined surface 60B such that the engagement leg 50C gets out of the engagement recess 60, and the cutter blade operation lever 50 tilts rearward beyond the off position with an increasing reaction force.

Thereby, a first releasable engagement mechanism (torque limiter) is constituted, such that so long as an external force in the rearward tilting direction that is larger than or equal to the prescribed value does not act on the cutter blade operation lever 50, the cutter blade operation lever 50 and the left rotary shaft 36 are engaged with each other in a force transmitting relationship, and if an excessive external force in the rearward tilting direction that is larger than the prescribed value, namely, larger than the urging force of the torsion coil spring 66, acts on the cutter blade operation lever 50, the force transmitting engagement between the cutter blade operation lever 50 and the left rotary shaft 36 is released, whereby the cutter blade operation lever 50 can be rotated relative to the left rotary shaft 36 in the rearward tilting direction. The first releasable engagement mechanism utilizes the spring force of the cutter blade operation lever 50 itself and does not require a separate spring member, and thus, the structure thereof can be simplified.

As shown in FIG. 7, the cam surface 62 is defined by a front orthogonal plane 62A orthogonally intersecting the first central axis Xa and a rear inclined surface 62B that is inclined outward in the rearward direction. When the cutter blade operation lever 50 is rotated between the off position and the on position, the engagement leg 50D slidably contacts the front orthogonal plane 62A, whereby the cutter blade operation lever 50 can rotate freely relative to the right rotary shaft 38, and hence, the right rotary shaft 38 does not rotate together with the cutter blade operation lever 50. In a case where an external force acting on the cutter blade operation lever 50 in the rearward tilting direction becomes larger than or equal to a prescribed value, the side portion 50F undergoes resilient deformation and the engagement leg 50D rides on and slides along the rear inclined surface 62B, whereby the cutter blade operation lever 50 tilts rearward beyond the off position with an increasing reaction force.

The travel operation lever 52 is formed by bending a metal rod having a circular cross section. The travel operation lever 52 integrally includes: left and right shaft portions 52A, 52B extending along a second central axis Xb, which is offset rearward from and extends in parallel to the first central axis Xa, at the respective ends of the travel operation lever 52; left and right engagement legs 52C, 52D bent upward from the outer ends of the respective shaft portions 52A, 52B at a right angle so as to extend radially outward (upward) with respect to the second central axis Xb; left and right side portions 52E, 52F extending further upward from the upper ends of the engagement legs 52C, 52D; and a lever grip 52G bent laterally from the upper ends of the side portions 52E, 52F and extending laterally behind the upper bar 28, whereby the travel operation lever 52 has a substantially U-shape as seen from the front, and is given a spring property in a direction of movement of the engagement legs 52C, 52D toward and away from each other. An exterior cover 64 made by molding a resin is fitted to the rear side of the travel operation lever 52 to cover the portions other than the shaft portions 52A, 52B.

The lever support collar member 48 and the right lever support block 46 are respectively provided with round bearing holes 65, 67 on outer sides thereof such that the shaft portions 52A, 52B of the travel operation lever 52 are received in the bearing holes 65, 67 so as to be rotatable about the second central axis Xb. The bearing hole 67 of the right lever support block 46 is provided at a position offset rearward and inward with respect to the other bearing hole 58 provided in the right lever support block 46.

The outer end surface of the lever support collar member 48, namely, the end surface in which the bearing hole 65 is opened, is formed with a substantially semi-circular groove-shaped engagement recess (second engagement recess) 70 that extends from the bearing hole 65 radially outward (upward) with respect to the left rotary shaft 36 to engage the engagement leg (second rod) 52C. The right lever support block 46 is formed with a substantially semi-circular groove-shaped engagement recess (second engagement recess) 72 that extends from the open end of the bearing hole 67 radially outward (upward) with respect to the right rotary shaft 38 to engage the engagement leg (second rod) 52D. The engagement legs 52C, 52D are pressed against the bottoms of the engagement recesses 70, 72, respectively, by the spring force of the travel operation lever 52 itself.

With the shaft portions 52A, 52B received in the corresponding bearing holes 65, 67, the travel operation lever 52 is rotatable relative to the left rotary shaft 36 and the right rotary shaft 38 about the second central axis Xb together with the right lever support block 46. Further, with the engagement leg 52D engaged with the engagement recess 72, the travel operation lever 52 is connected with the right rotary shaft 38 in a force transmitting relationship.

Figure 11:
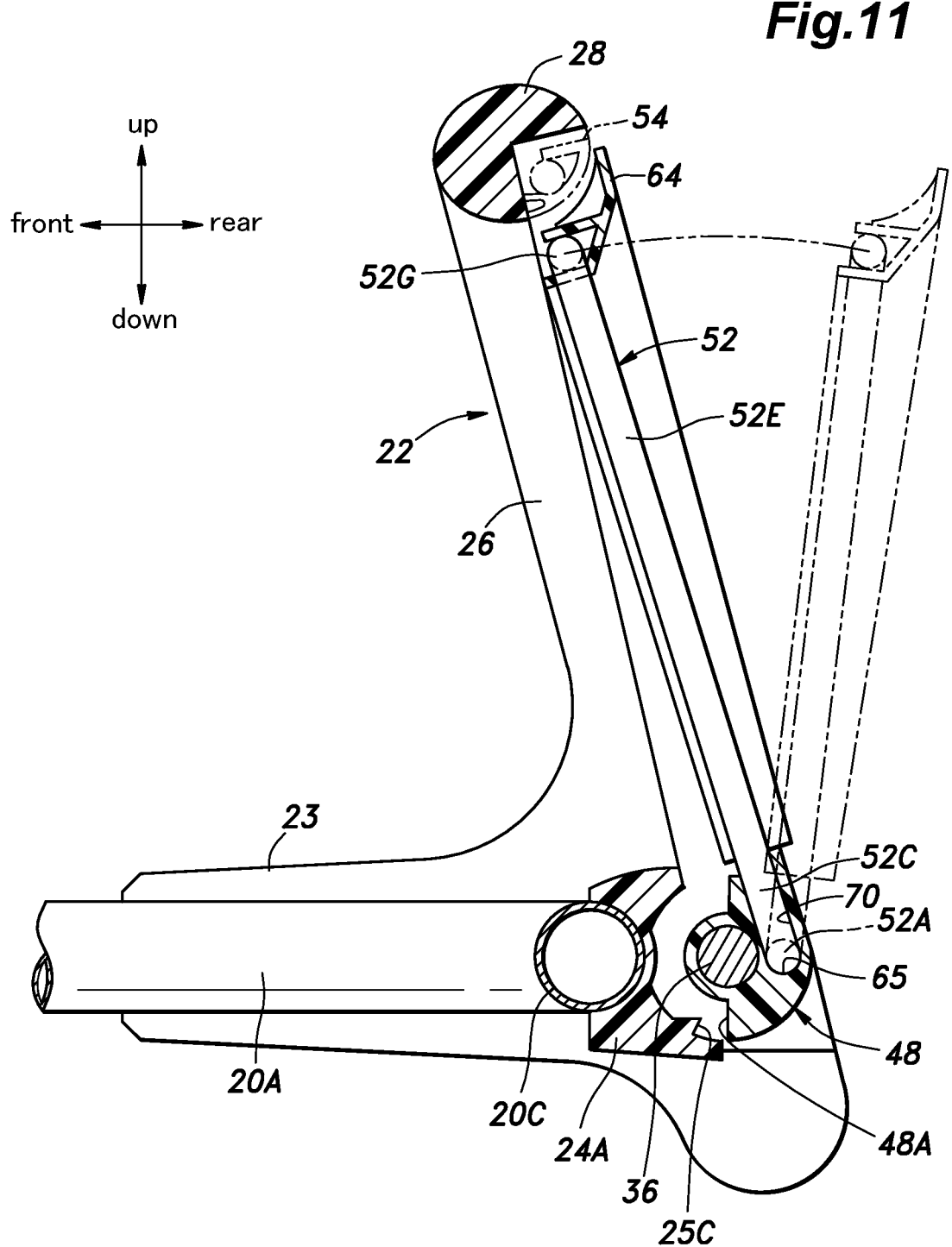
FIG. 11 is a vertical sectional view of a left side portion of a travel operation lever of the electric lawn mower according to the embodiment.
Figure 12:
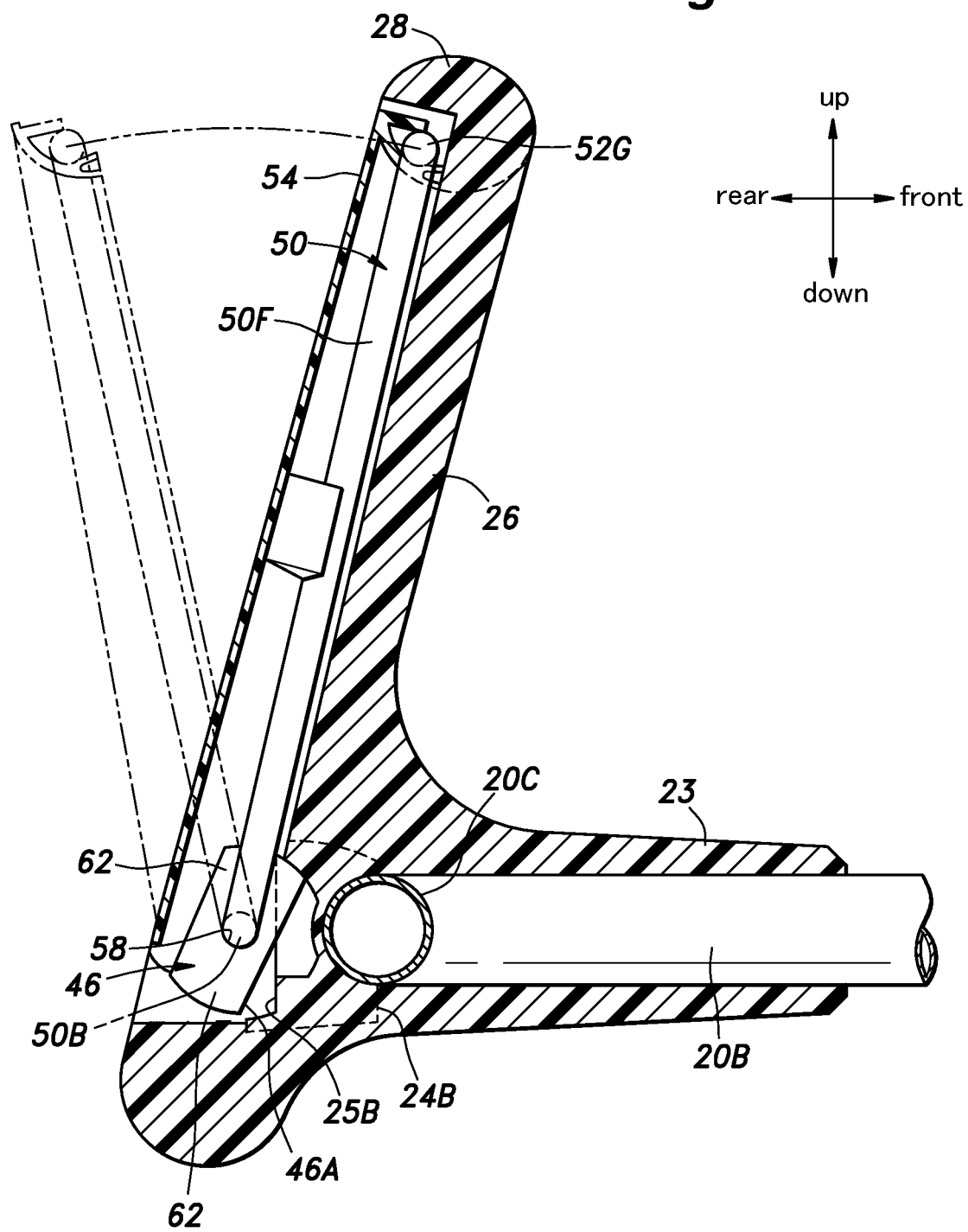
FIG. 12 is a vertical sectional view of a right side portion of the cutter blade operation lever of the electric lawn mower according to the embodiment.

With the engagement legs 52C, 52D engaged with the corresponding engagement recesses 70, 72, namely, in a state where the travel operation lever 52 and the right rotary shaft 38 are engaged with each other in a force transmitting relationship, the travel operation lever 52 is rotatable about the second central axis Xb with the shaft portions 52A, 52B serving as fulcrums between a position (hereinafter, off position) where the travel operation lever 52 has been rotated clockwise in FIG. 11 (tilted rearward) and the lever grip 52G is positioned distant from the upper bar 28 as shown by imaginary lines in FIG. 11 and a position (hereinafter, on position) where the travel operation lever 52 has been rotated from the off position counterclockwise in FIG. 11 (tilted forward) and the lever grip 52G is positioned close to the upper bar 28 as shown by solid lines in FIG. 11.

Figure 13:
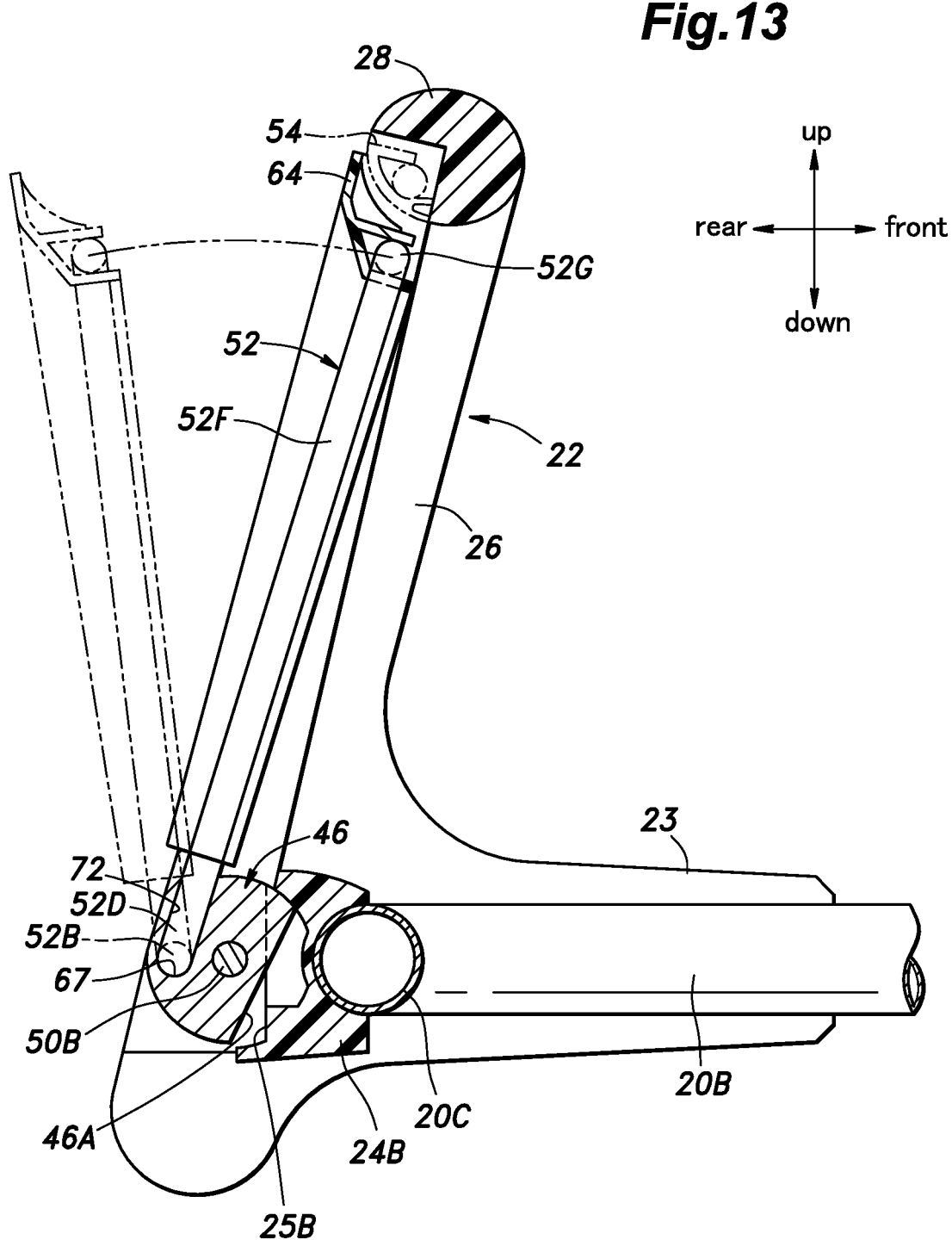
FIG. 13 is a vertical sectional view of a right side portion of the travel operation lever of the electric lawn mower according to the embodiment.

The travel operation lever 52 is at the off position when the right rotary shaft 38 is at the third rotational position, and the travel operation lever 52 is at the on position when the right rotary shaft 38 is at the fourth rotational position. As shown in FIGS. 11 and 13, the third rotational position of the right rotary shaft 38 and the off position of the travel operation lever 52 are determined by abutment of stopper surfaces 46A, 48A respectively formed in the right lever support block 46 and the lever support collar member 48 against corresponding stopper surfaces 25B, 25C formed in the base portion 24A, while the on position of the travel operation lever 52 is determined by abutment of the exterior cover 64 against the exterior cover 54 of the cutter blade operation lever 50 placed at the on position.

A torsion coil spring 68 (see FIG. 5) is provided between the right rotary shaft 38 and the lower bar 24 to urge the right rotary shaft 38 clockwise as seen in FIG. 10. Thereby, the travel operation lever 52 is urged together with the right rotary shaft 38 by the torsion coil spring 68 toward the off position, so that when no external force is applied, the travel operation lever 52 is placed at the off position.

The left rotary shaft 36 is disposed in front of the open end of the engagement recess 70, and a barrier surface 46B formed by a rear surface of the right lever support block 46 is disposed in front of the open end of the engagement recess 72. Thereby, even if a large external force is applied to the travel operation lever 52 in a forward tilting direction, abutment of the left rotary shaft 36 against the engagement leg 52C and abutment of the barrier surface 46B against the engagement leg 52D prevent the engagement legs 52C, 52D from getting out of the engagement recesses 70, 72, respectively. In a case where an external force is applied to the travel operation lever 52 in a rearward tilting direction, if the external force is smaller than a prescribed value smaller than the urging force of the torsion coil spring 68, the engagement legs 52C, 52D do not get out of the engagement recesses 70, 72, but if the rearward external force acting on the travel operation lever 52 becomes larger than or equal to the prescribed value, the side portions 50E, 50F undergo resilient deformation and the engagement legs 52C, 52D get out of the engagement recesses 70, 72, such that the travel operation lever 52 tilts rearward beyond the off position with an increasing reaction force.

Thereby, a second releasable engagement mechanism (torque limiter) is constituted, such that so long as an external force in the rearward tilting direction that is larger than or equal to the prescribed value does not act on the travel operation lever 52, the travel operation lever 52 and the right rotary shaft 38 are engaged with each other in a force transmitting relationship, and if an excessive external force in the rearward tilting direction that is larger than the prescribed value, namely, larger than the urging force of the torsion coil spring 68, acts on the travel operation lever 52, the force transmitting engagement between the travel operation lever 52 and the right rotary shaft 38 is released, whereby the travel operation lever 52 can be rotated relative to the right rotary shaft 38 in the rearward tilting direction. The second releasable engagement mechanism utilizes the spring force of the travel operation lever 52 itself and does not require a separate spring member, and thus, the structure thereof can be simplified.

As seen from the front, the cutter blade operation lever 50 has a relatively simple U-shape with the linear side portions 50E, 50F, whereas the side portions 52E, 52F of the travel operation lever 52 each have a stepped (convex) portion. As a result, the lever grip 50G of the cutter blade operation lever 50 overlaps the lever grip 52G of the travel operation lever 52 only over a laterally central section A (see FIG. 4). This allows the operator to grasp the lever grip 50G of the cutter blade operation lever 50 and the lever grip 52G of the travel operation lever 52 simultaneously at the central section A of the lever grip 50G of the cutter blade operation lever 50, and to grasp only the lever grip 50G of the cutter blade operation lever 50 at laterally side sections B (see FIG. 4) of the lever grip 50G.

Thus, the cutter blade operation lever 50 and the travel operation lever 52 have different shapes as seen from the front so as to provide the central section A in which the both levers 50 and 52 can be easily grasped simultaneously and the side sections B in which only the travel operation lever 52 can be grasped easily.

The exterior cover 54 of the cutter blade operation lever 50 has an upper portion and left and right side portions overlapping the exterior cover 64 of the travel operation lever 52 from the front of the exterior cover 64. In other words, the exterior cover 64 of the travel operation lever 52 has an upper portion and left and right side portions overlapping the exterior cover 54 of the cutter blade operation lever 50 from behind the exterior cover 54. Thereby, the cutter blade operation lever 50 engages the travel operation lever 52 via the exterior covers 54, 64 when rotated toward the off position, while the travel operation lever 52 engages the cutter blade operation lever 50 via the exterior covers 54, 64 when rotated toward the on position. Therefore, the cutter blade operation lever 50 and the travel operation lever 52 can be placed at the on position simultaneously, but it is not possible to place only the travel operation lever 52 at the on position. Namely, it is prohibited to place only the travel operation lever 52 at the on position.

The exterior cover 64 includes ear-shaped operation parts 64A on inner sides of the left and right side portions thereof overlapping with the exterior cover 54 from behind. When the travel operation lever 52 is at the off position, if the operation parts 64A are pushed forward (toward the on position), the cutter blade operation lever 50 which is pushed by the travel operation lever 52 is moved toward the on position.

Figure 4:
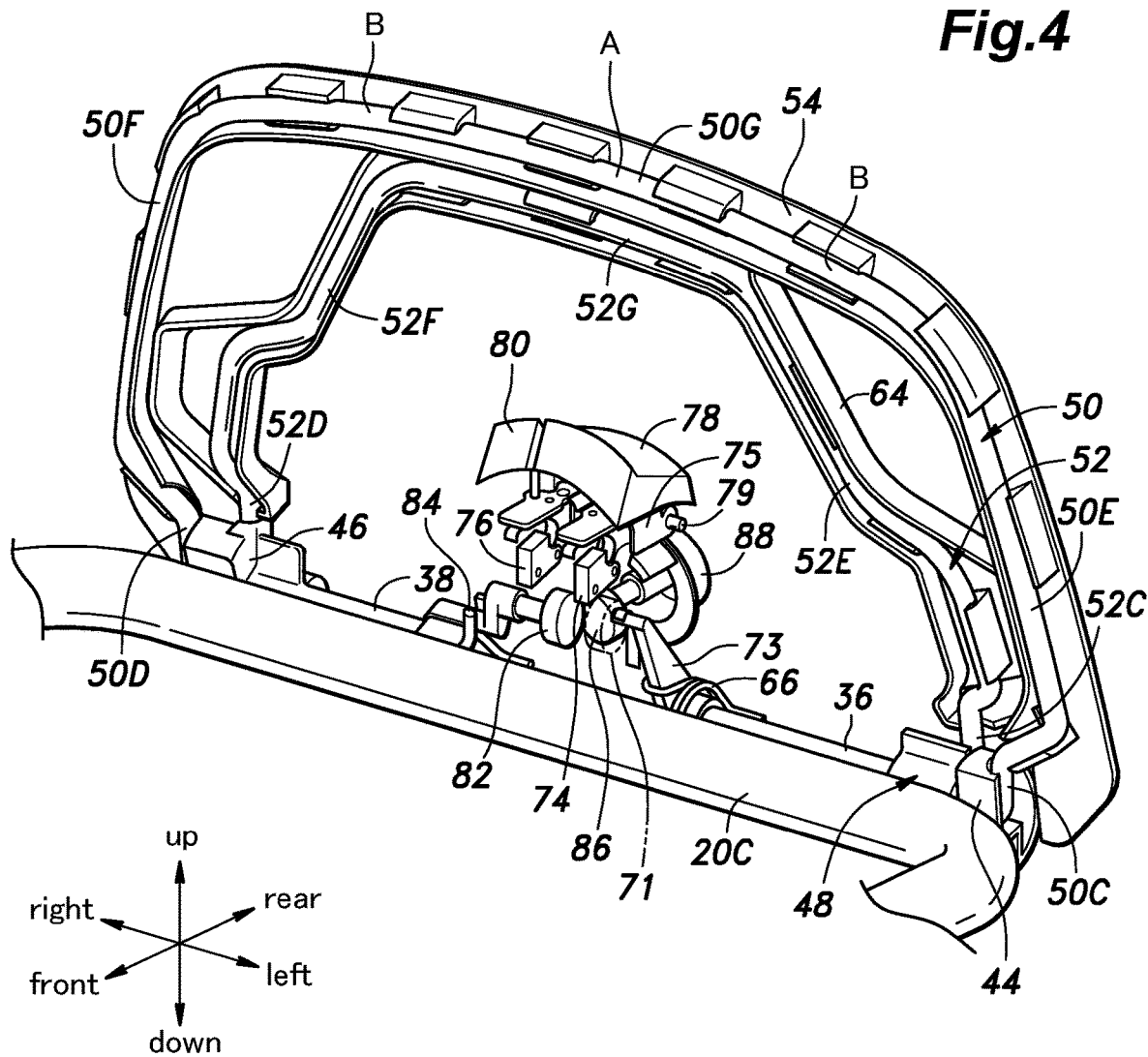
FIG. 4 is a rear perspective view of the operating portion of the electric lawn mower according to the embodiment (a perspective view with a handle removed)
Figure 5:
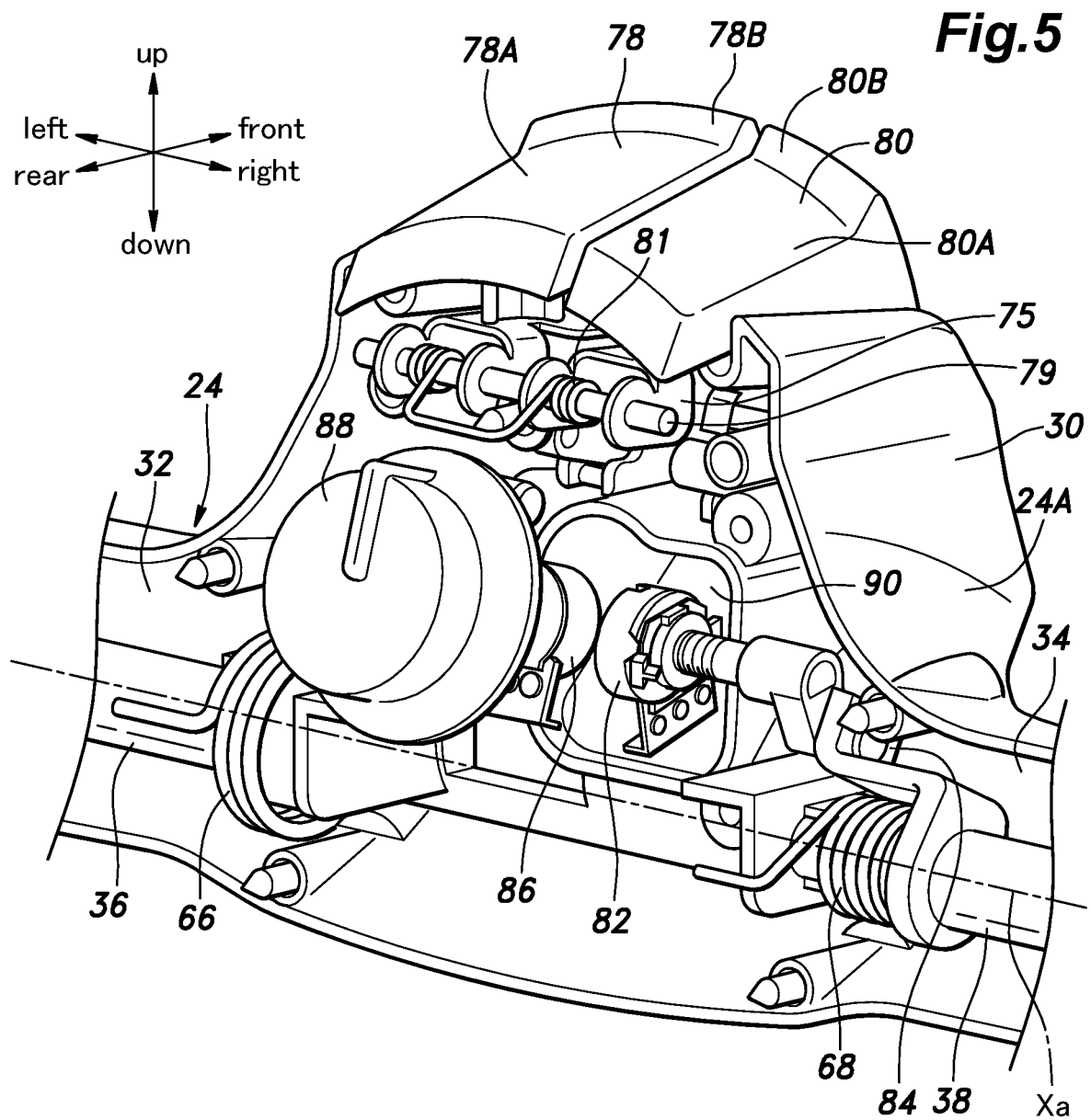
FIG. 5 is an enlarged rear perspective view of an electric box of the operating portion of the electric lawn mower according to the embodiment (a perspective view with a cover removed)

As shown in FIGS. 4 and 5, a cutter blade on/off switch 71 is provided in a left part of the electric box 30. The cutter blade on/off switch 71 serves as a motor drive command unit for the cutter blade electric motor 6, and is operated by an operation arm 73 attached to the inner end of the left rotary shaft 36, such that the switch 71 is turned off when the cutter blade operation lever 50 is at the off position, and is turned on when the cutter blade operation lever 50 is moved out of the off position toward the on position.

Provided in a central part of the electric box 30 are a high speed setting switch 74 and a low speed setting switch 76. The high speed setting switch 74 and the low speed setting switch 76 are momentary switches and output on signals to the controller 11 to switch the rotational speed of the cutter blade 3 between two levels, namely, a high speed and a low speed.

The high speed setting switch 74 and the low speed setting switch 76 are operated by push buttons 78, 80 arranged next to each other in the lateral direction in an upper part of the electric box 30. The push buttons 78, 80 have rear portions pivotably supported by a common horizontally extending pivot shaft 79 on a button supporting member 75 fixed to the electric box 30, and is urged upward by a spring force of a torsion coil spring 81. The upper surfaces (pressing surfaces) 78A, 80A of the push buttons 78, 80 are each exposed upward in an upper part of the electric box 30. The upper surfaces 78A, 80A each have a rectangular shape elongated in a fore-and-aft direction, and are disposed next to each other in the lateral direction. The lengths of the upper surfaces 78A, 80A in the fore-and-aft direction are the same, but the upper surface 78A has a lateral width larger than that of the upper surface 80A. Namely, the push button 78 of the high speed setting switch 74 has a larger pressing surface than the push button 80 of the low speed setting switch 76. Lands 78B, 80B are provided to protrude from front portions of the upper surfaces 78A, 80A, respectively, to prevent finger slipping.

In a right part of the electric box 30, a potentiometer 82 for setting the travel speed is provided. The potentiometer 82 serves as a motor drive command unit for the travel electric motor 7, and is operated by an operation arm 84 attached to the inner end of the right rotary shaft 38, such that the potentiometer 82 outputs a travel stop command when the travel operation lever 52 is at the off position, and outputs a travel command for increasing the travel speed along with an increase in the forward tilt angle of the travel operation lever 52 toward the on position.

A potentiometer 86 for setting a maximum travel speed is disposed in the central part of the electric box 30. The potentiometer 86 is operated by a dial 88 provided on a side of the electric box 30 facing the operator, and outputs a command to set the maximum travel speed to a higher value as the dial 88 is turned more in the clockwise direction as seen from the operator.

A waterproof chamber 90 is defined in the electric box 30 by partition walls, and the potentiometers 82, 86 are placed in the waterproof chamber 90 to ensure high waterproofness.

The cutter blade on/off switch 71, the high speed setting switch 74, the low speed setting switch 76, and the potentiometers 82, 86 disposed in the electric box 30 are electrically connected with the controller 11 by a wire harness (not shown in the drawing) passed through the pipe forming the longitudinal members 20A, 20B and the cross member 20C.

Figure 14:
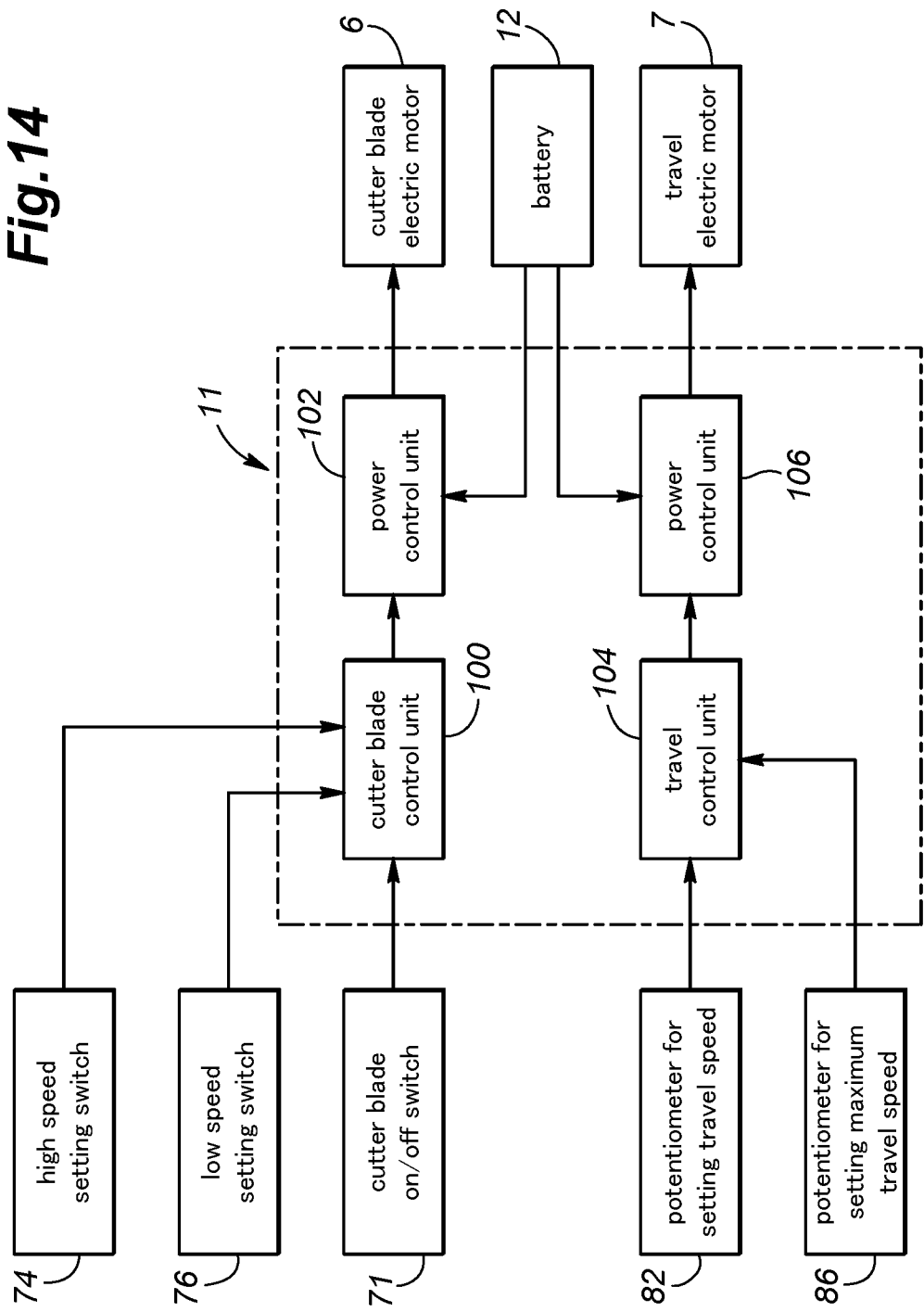
FIG. 14 is a block diagram showing an exemplary control system of the electric lawn mower according to the embodiment.

The controller 11 is constituted of an electronic control unit (ECU) configured by a microcomputer, a ROM, a RAM, a peripheral circuit, an input/output interface, etc. As shown in FIG. 14, the controller 11 includes a cutter blade control unit 100 that conducts on/off control and rotational speed control of the cutter blade electric motor 6 based on the signals input from the cutter blade on/off switch 71, the high speed setting switch 74 and the low speed setting switch 76, and a power control unit 102 that controls the electric power supplied from the battery 12 to the cutter blade electric motor 6 by means of PWM control or the like based on the commands from the cutter blade control unit 100.

In addition, the controller 11 includes a travel control unit 104 that conducts on/off control and rotational speed control of the travel electric motor 7 based on the signals input from the potentiometers 82, 86, and a power control unit 106 that controls the electric power supplied from the battery 12 to the travel electric motor 7 by means of PWM control or the like based on the commands from the travel control unit 104.

Because all of the cutter blade on/off switch 71, the high speed setting switch 74, the low speed setting switch 76, and the potentiometers 82, 86 are concentratedly arranged in the electric box 30 at the laterally central position, it is possible to avoid increasing the profile of the pivoting ends of the cutter blade operation lever 50 and the travel operation lever 52 to arrange the switches and potentiometers therein. Therefore, deterioration of design and reduction of operability of the operation levers 50, 52 due to reduction in an operation space can be prevented. In addition, the concentrated arrangement enables easy routing of a wire harness, and facilitates maintenance work.

Further, it is possible to easily add switches and potentiometers with a high freedom of design to augment the control functions of the high speed setting switch 74, the low speed setting switch 76, the potentiometer 86 for setting the maximum travel speed or the like, and to add the push buttons 78, 80 and the dial 88, which are operation elements therefor, without increase in the profile of the pivoting ends of the operation levers 50 and 52.

In the electric lawn mower 1 having the above-described structure, when neither of the cutter blade operation lever 50 and the travel operation lever 52 is operated by the operator, the cutter blade operation lever 50 and the travel operation lever 52 are both at the off position due to the spring force exerted by the torsion coil springs 66, 68. Therefore, the cutter blade on/off switch 71 is in the off state, which causes the cutter blade electric motor 6 to stop so that the cutter blade 3 is stopped. Further, the potentiometer 82 is at the zero position (outputs a travel stop command), which causes the travel electric motor 7 to stop so that the electric lawn mower 1 is stopped.

When the central parts of the lever grip 50G of the cutter blade operation lever 50 and the lever grip 52G of the travel operation lever 52 are both grasped by the operator such that the cutter blade operation lever 50 and the travel operation lever 52 are tilted forward from the off position toward the on position against the spring force of the torsion coil springs 66, 68, the cutter blade on/off switch 71 is turned on to cause the cutter blade electric motor 6 to rotate at the maximum speed set by the high speed setting switch 74 and the low speed setting switch 76, which in turn causes the cutter blade 3 to rotate, while the potentiometer 82 outputs a travel command in accordance with the forward tilting angle of the travel operation lever 52 to cause the travel electric motor 7 to rotate at the rotational speed corresponding to the travel command, which in turn causes the electric lawn mower 1 to travel forward at the speed corresponding to the forward tilting angle of the travel operation lever 52. Thereby, the electric lawn mower 1 performs mowing while traveling forward. Once the travel operation lever 52 reaches the on position, the electric lawn mower 1 travels forward at the maximum speed set by the potentiometer 86.

Even during the forward travel, the maximum travel speed of the electric lawn mower 1 can be changed by turning the dial 88 of the potentiometer 86. Further, the rotational speed of the cutter blade 3 can be switched between the high speed and the low speed by selectively pressing the push button 78 or 80. Because the dial 88 and the push buttons 78, 80 are concentratedly arranged at the laterally central position below the lever grips 50G, 52G of the cutter blade operation lever 50 and the travel operation lever 52, even when grasping the cutter blade operation lever 50 and the travel operation lever 52 with one hand, the operator can easily operate the dial 88 and the push buttons 78, 80 with the other hand. Further, it is possible to select the rotational speed of the cutter blade 3 by operating the push buttons 78, 80 at the same time when starting the rotation of the cutter blade 3 by operating the cutter blade operation lever 50.

Moreover, because the upper surface 78A of the push button 78 of the high speed setting switch 74 has a larger width than the upper surface 80A of the push button 80 of the low speed setting switch 76, there is a difference in area between the upper surfaces 78A, 80A of the push buttons 78, 80. This enables the operator to visually distinguish the push button 78 of the high speed setting switch 74 and the push button 80 of the low speed setting switch 76 from each other easily and reliably.

When the travel operation lever 52 is released and returns to the off position, the travel electric motor 7 is stopped, and hence, the electric lawn mower 1 stops traveling. In this state, if the cutter blade operation lever 50 is at the on position, the cutter blade electric motor 6 drives the cutter blade 3 to rotate, whereby the mowing is performed while the electric lawn mower 1 is stationary.

Owing to the above-described interaction between the cutter blade operation lever 50 and the travel operation lever 52, it is prohibited to place only the travel operation lever 52 at the on position. Therefore, when the cutter blade 3 is not rotating, namely, when the mowing is not performed, the electric lawn mower 1 is not caused to travel by the travel electric motor 7. This reduces consumption of the electric power stored in the battery 12. It is to be noted that when the cutter blade 3 is not rotating, namely, when the mowing is not performed, the operator can move the electric lawn mower 1 by pushing it manually.

When an excessive external force in the rearward tilting direction is applied to the cutter blade operation lever 50 inadvertently, the engagement leg 50C gets out of the engagement recess 60, whereby the force transmitting engagement between the cutter blade operation lever 50 and the left rotary shaft 36 is released, and the cutter blade operation lever 50 is allowed to rotate beyond the off position in the rearward tilting direction relative to the left rotary shaft 36. Therefore, an excessive load is prevented from acting on the cutter blade operation lever 50 and/or the stopper surfaces 44A, 46A, 48A and the stopper surfaces 25A, 25B, 25C.

Further, when an excessive external force in the rearward tilting direction is applied to the travel operation lever 52 inadvertently, the engagement legs 52C, 52D get out of the engagement recesses 70, 72, whereby the force transmitting engagement between the travel operation lever 52 and the right rotary shaft 38 is released, and the travel operation lever 52 is allowed to rotate beyond the off position in the rearward tilting direction relative to the right rotary shaft 38. Therefore, an excessive load is prevented from acting on the travel operation lever 52 and/or the stopper surfaces 44A, 46A, 48A and the stopper surfaces 25A, 25B, and 25C.

Owing to the above features, even if the operator inadvertently rotates the cutter blade operation lever 50 or the travel operation lever 52 rearward with an excessive force, deformation or damage to the operation levers 50, 52 as well as to the stopper mechanism that determines the off position can be avoided. Also, the stopper mechanism determining the off position and the operation levers 50, 52 are allowed to have a reduced strength, and therefore, they may be made more compact or thinner, and the degree of freedom of design of the operation levers 50, 52 can be improved, providing a sense of unity between the loop handle 22 and the operation levers 50, 52 or making the operation levers 50, 52 comfort to grip.

When the cutter blade operation lever 50 and the travel operation lever 52 are tilted rearward beyond the off position, a reaction force against the operation of the operation levers 50, 52 is increased, causing a force required for operation to increase. This provides a braking effect, and enables the operator to note that the operation levers 50, 52 are tilted rearward beyond the off position, namely, beyond the normal rotation angle range.

Also, when the cutter blade operation lever 50 is tilted rearward beyond the off position, the engagement legs 50C, 50D need to ride over the inclined surfaces 60B, 62B, respectively. Thus, a detent mechanism is constituted, which provides a tactile feedback (click-like feel) to the operator when the cutter blade operation lever 50 is tilted rearward beyond the off position, to thereby enable the operator to note that the cutter blade operation lever 50 is tilted rearward beyond the off position, namely, beyond the normal rotation angle range.

When the travel operation lever 52 is tilted rearward beyond the off position, the engagement legs 52C, 52D need to get out of the engagement recesses 70, 72, respectively. Thus, a detent mechanism is constituted, which provides a tactile feedback (click-like feel) to the operator when the travel operation lever 52 is tilted rearward beyond the off position, to thereby enable the operator to note that the travel operation lever 52 is tilted rearward beyond the off position, namely, beyond the normal rotation angle range.

In the foregoing, the present invention has been described in terms of the preferred embodiment thereof, but it is obvious to a person skilled in the art that the present invention is not limited to the illustrated embodiment, and various alterations and modifications are possible without departing from the spirit of the present invention.

Figure 15:
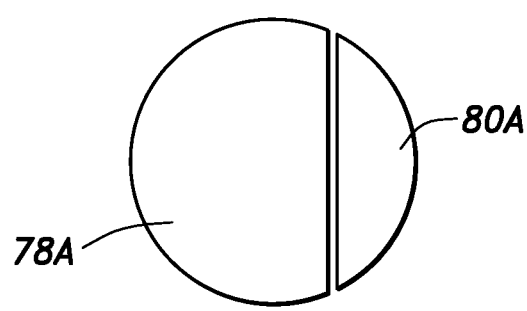
FIG. 15 is a schematic diagram showing another example of a push button upper surface of the electric lawn mower according to the embodiment.
Figure 16:
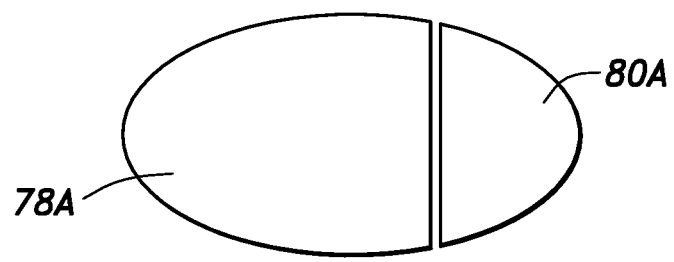
FIG. 16 is a schematic diagram showing a yet another example of the push button upper surface of the electric lawn mower according to the embodiment.

For instance, the positions of the cutter blade operation lever 50 and the travel operation lever 52 may be changed such that they are disposed in front of the loop handle 22, and the cutter blade operation lever 50 is disposed behind the travel operation lever 52. In this case, the cutter blade operation lever 50 and the travel operation lever 52 are rotated forward to be placed at the off position, and rotated rearward to be placed at the on position. It is also possible to exchange the functions of the cutter blade operation lever 50 and the travel operation lever 52 with each other. The shape of the upper surfaces 78A, 80A of the push buttons 78, 80 is not limited to a rectangular shape. As shown in FIGS. 15 and 16, the upper surfaces 78A, 80A may jointly form a circular surface or an elliptical surface, such that the upper surface 78A and the upper surface 80A are not equal in size. The number of the switches for setting the rotational speed of the cutter blade 3 is not limited to two but may be more than two.

The electric power equipment of the present invention is not limited to electric lawn mowers, but may be similarly applied to electric snow blowers, electric tillers, and the like.

Also, not all of the structural elements of the embodiment described above are necessarily indispensable, and they may be selectively used as appropriate without departing from the spirit of the present invention.

GLOSSARY 1 electric lawn mower
2 main body
3 cutter blade
4 front wheel
5 rear wheel
6 cutter blade electric motor
7 travel electric motor
8 cutter blade chamber
9 output shaft
10 grass bag
11 controller
12 battery
20 handle
20A longitudinal member
20B longitudinal member
20C cross member
21 handle bar
22 loop handle
23 fixing part
24 lower bar
24A base portion
24B cover member
25A stopper surface
25B stopper surface
25C stopper surface
26 side bar
28 upper bar
30 electric box
32 tubular portion
33 bracket
34 tubular portion
35 bracket
36 left rotary shaft
38 right rotary shaft
42 bracket
44 left lever support block
44A stopper surface
46 right lever support block
46A stopper surface
46B barrier surface
48 lever support collar member
48A stopper surface
49 through-hole
50 cutter blade operation lever
50A shaft portion
50B shaft portion
50C engagement leg
50D engagement leg
50E side portion
50F side portion
50G lever grip
51 exterior cover
52 travel operation lever
52A shaft portion
52B shaft portion
52C engagement leg
52D engagement leg
52E side portion
52F side portion
52G lever grip
54 exterior cover
56 bearing hole
58 bearing hole
60 engagement recess
60A barrier surface
60B inclined surface
62 cam surface
62A orthogonal plane
62B inclined surface
64 exterior cover 64A operation parts
65 bearing hole
66 torsion coil spring
67 bearing hole
68 torsion coil spring
70 engagement recess
71 cutter blade on/off switch
72 engagement recess
73 operation arm
74 high speed setting switch
75 button supporting member
76 low speed setting switch
78 push button
78A upper surface
78B land
79 pivot shaft
80 push button
80A upper surface
80B land
81 torsion coil spring
82 potentiometer
84 operation arm
86 potentiometer
88 dial
90 waterproof chamber
100 cutter blade control unit
102 power control unit
104 travel control unit
106 power control unit
Xa first central axis
Xb second central axis

The invention claimed is:

1. Electric power equipment, comprising:
a main body;
a work unit and wheels provided on the main body;
a work unit electric motor provided on the main body for driving the work unit;
a handle including a longitudinal member extending rearward from the main body; and
a speed setting device provided on the handle for setting a rotational speed of the work unit electric motor,
wherein the speed setting device comprises:
a first switch for setting a first rotational speed and a second switch for setting a second rotational speed that is slower than the first rotational speed; and
first and second operation buttons respectively provided for the first and second switches,
wherein the first and second operation buttons have operation parts provided with mutually different sizes.

2. The electric power equipment according to claim 1, wherein the operation part of the first button is larger in size than the operation part of the second button.

3. The electric power equipment according to claim 1, wherein the speed setting device is configured to set a maximum rotational speed of the work unit electric motor, and
an on/off switch for turning on and off the work unit electric motor and an operation element of the on/off switch are further provided on the handle.

4. The electric power equipment according to claim 3, wherein the operation element of the on/off switch consists of a U-shaped operation lever extending laterally and having left and right ends rotatably attached to the handle, and
the first and second operation buttons are arranged at a laterally central part of the handle.

5. The electric power equipment according to claim 1, wherein the work unit includes a cutter blade for lawn mowing.

* * * * *